(12) United States Patent
Hoffmann (10) Patent No.: US 10,285,075 B2
(45) Date of Patent: May 7, 2019

(54) DEVICE IDENTIFICATION VIA PEER EXCHANGE

(71) Applicant: The Boeing Company, Chicago, IL (US)

(72) Inventor: Ceilidh Hoffmann, Huntington Beach, CA (US)

(73) Assignee: THE BOEING COMPANY, Chicago, IL (US)

( * ) Notice: Subject to any disclaimer, the term of this patent is extended or adjusted under 35 U.S.C. 154(b) by 338 days.

(21) Appl. No.: 13/911,538

(22) Filed: Jun. 6, 2013

(65) Prior Publication Data

US 2014/0362725 A1    Dec. 11, 2014

(51) Int. Cl.
*H04W 24/02*     (2009.01)

(52) U.S. Cl.
CPC .................................. *H04W 24/02* (2013.01)

(58) Field of Classification Search
None
See application file for complete search history.

(56) References Cited

U.S. PATENT DOCUMENTS

| | | | |
|---|---|---|---|
| 2005/0135319 A1 | 6/2005 | Shi et al. | |
| 2005/0143100 A1 | 6/2005 | Shi et al. | |
| 2006/0071780 A1 | 4/2006 | McFarland et al. | |
| 2009/0213828 A1 | 8/2009 | Brundage et al. | |
| 2010/0014443 A1* | 1/2010 | Cristian | G01S 5/0289 370/255 |
| 2011/0312279 A1* | 12/2011 | Tsai | G01S 11/02 455/67.11 |
| 2013/0045750 A1 | 2/2013 | Kim et al. | |

FOREIGN PATENT DOCUMENTS

| | | |
|---|---|---|
| GB | 2479627 A | 10/2011 |
| WO | WO 2002/054100 A2 | 7/2002 |
| WO | WO 2009/155036 A2 | 12/2009 |

OTHER PUBLICATIONS

Great Britain Application No. 1409096.3; Combined Search and Examination Report; dated Nov. 18, 2014; 8 pages.

* cited by examiner

*Primary Examiner* — Yemane Mesfin
*Assistant Examiner* — Jeff Banthrongsack
(74) *Attorney, Agent, or Firm* — Gates & Cooper LLP (57) ABSTRACT

In an ad hoc wireless network, nodes determine contextual locations based at least in part on measured ranges to a plurality of fixed nodes having predetermined locations. When the contextual locations contains at least one error, the contextual locations are updated based at least in part on measured ranges between pairs of nodes in the ad hoc wireless network.

13 Claims, 11 Drawing Sheets

DEVICE IDENTIFICATION VIA PEER EXCHANGE

BACKGROUND

In a mesh network, each node may communicate with other nodes connected to the mesh network. Data may also be propagated from node to node until the destination is reached or until all the nodes have received the data. The mesh network may change configuration as nodes are added to the mesh network or removed from the mesh network. In a wireless mesh network, the nodes may include radios for wireless transmission/reception with peer nodes. In addition to mobile computing devices, a wireless mesh network may also include routers and gateways. Wireless mesh networks can be implemented with a number of wireless technologies including 802.11, ZigBee®, and cellular technologies.

A mesh network can also be an ad hoc network. An ad hoc network does not require a preexisting infrastructure and may be formed on the fly when two or more wireless devices come within communication range of each other. Nodes may associate with any other node in the ad hoc network. Furthermore, nodes in an ad hoc network may route and forward data intended for other nodes.

SUMMARY

Illustrative examples of the present invention include, without limitation, a method, system, and computer-readable storage medium. In one aspect, a method for configuring nodes in a wireless network is provided. Contextual locations for a set of nodes in the wireless network may be determined. The contextual locations may be determined based on measured ranges to fixed nodes having predetermined locations. It may be determined that the set of locations contains one or more errors. The contextual locations of the set of nodes may be updated based on measured ranges between pairs of nodes.

In another aspect, a device configured to communicate in a peer-to-peer wireless network is provided. The device may include a radio configured to communicate in the peer-to-peer wireless network. A contextual location may be determined based on measured ranges to fixed nodes having predetermined locations. Range data measured by other devices communicating in the peer-to-peer wireless network may be received. The range data may be indicative of distances to other devices. The determined contextual location may be updated based on the received range data.

In another aspect, a non-transitory computer-readable storage medium is provided. A contextual location may be determined based on measured ranges to a plurality of fixed nodes having predetermined locations. Contextual locations of other devices communicating in the peer-to-peer wireless network may be received. It may be determined that one of the contextual locations of the other devices is erroneous. A range to the device with the erroneous contextual location may be measured. The measured range may be broadcasted over the peer-to-peer wireless network.

Other features of the inventive system and method are described below. The features, functions, and advantages can be achieved independently in various examples or may be combined in yet other examples, further details of which can be seen with reference to the following description and drawings.

BRIEF DESCRIPTION OF DRAWINGS

Examples of techniques in accordance with the present disclosure are described in detail below with reference to the following illustrations.

DETAILED DESCRIPTION

Figure 1:
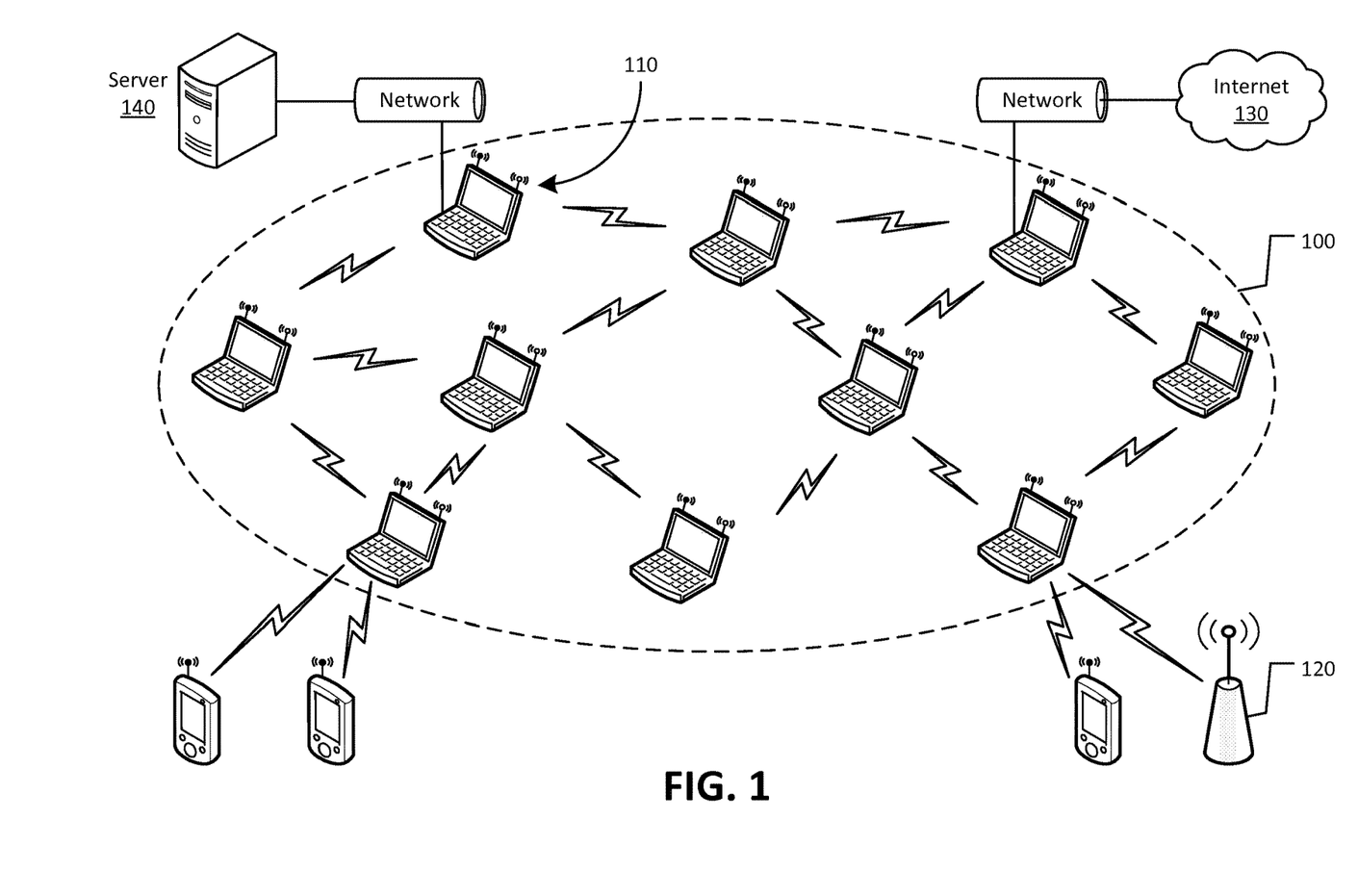
FIG. 1 depicts an example of a wireless mesh network.

FIG. 1 depicts an example of a wireless mesh network 100. The wireless mesh network 100 may include a number of wireless devices or nodes 110. The wireless devices or nodes 110 may be communicatively coupled or peered with other wireless devices or nodes 110 in the wireless mesh network 100. As shown, some of the wireless devices or nodes 110 may be peered with more than one other of the wireless devices or nodes 110. A wireless device or node 110 that is peered with another wireless device or node 110 may be referred to as a peer wireless device or node or a peered wireless device or node. Some of the wireless devices or nodes 110 may further be communicatively coupled to other devices 120, such as a wireless access point. Some local devices may only be accessible by the coupled wireless device or node. One or more of the wireless devices or nodes 110 may further be communicatively coupled to another network such as the Internet 130. One or more of the wireless devices or nodes 110 may further be communicatively coupled to other computing devices such as server 140. Each of the wireless devices or nodes 110 may send and receive data as well as relay data for others of the wireless devices or nodes 110 connected to the wireless mesh network 100. The wireless mesh network 100 may dynamically change configuration as nodes are added or removed. The wireless mesh network 100 can be implemented with any number of wireless technologies, such as IEEE 802.11 or ZigBee®, or the like.

In a wireless mesh network comprising many wireless devices or nodes, it may be desirable to have the capability of determining location information for the devices or nodes in the mesh network. The location information can be absolute—e.g., the latitude and longitude coordinates for the device with respect to the earth. Alternatively, the location information can be relative (e.g., two feet to the north of a reference point). The location information can also be contextual (e.g., the first aisle seat on the left of an aircraft or a conference room).

The satellite-based Global Positioning System (GPS) and terrestrial cellular network-based Enhanced 911 (E911) system are two well-known services for determining location of a device. In the case of GPS, the wireless device may have installed a GPS receiver device. For the cellular E911 service, the wireless device may be a cellular phone. Both services use a two-step process to identify a device's position. First, ranging or pair-wise distance measurement between the device and a wireless signal source (a GPS satellite or a cellular transceiver tower) is performed. At least two or three range measurements—each from a different signal source—are used to determine the target's location. The range may be a distance between a source (or anchor) and a device (or target) that can be derived from signal power loss due to propagation or via elapsed propagation time between the source transmission and the device.

Figure 2:
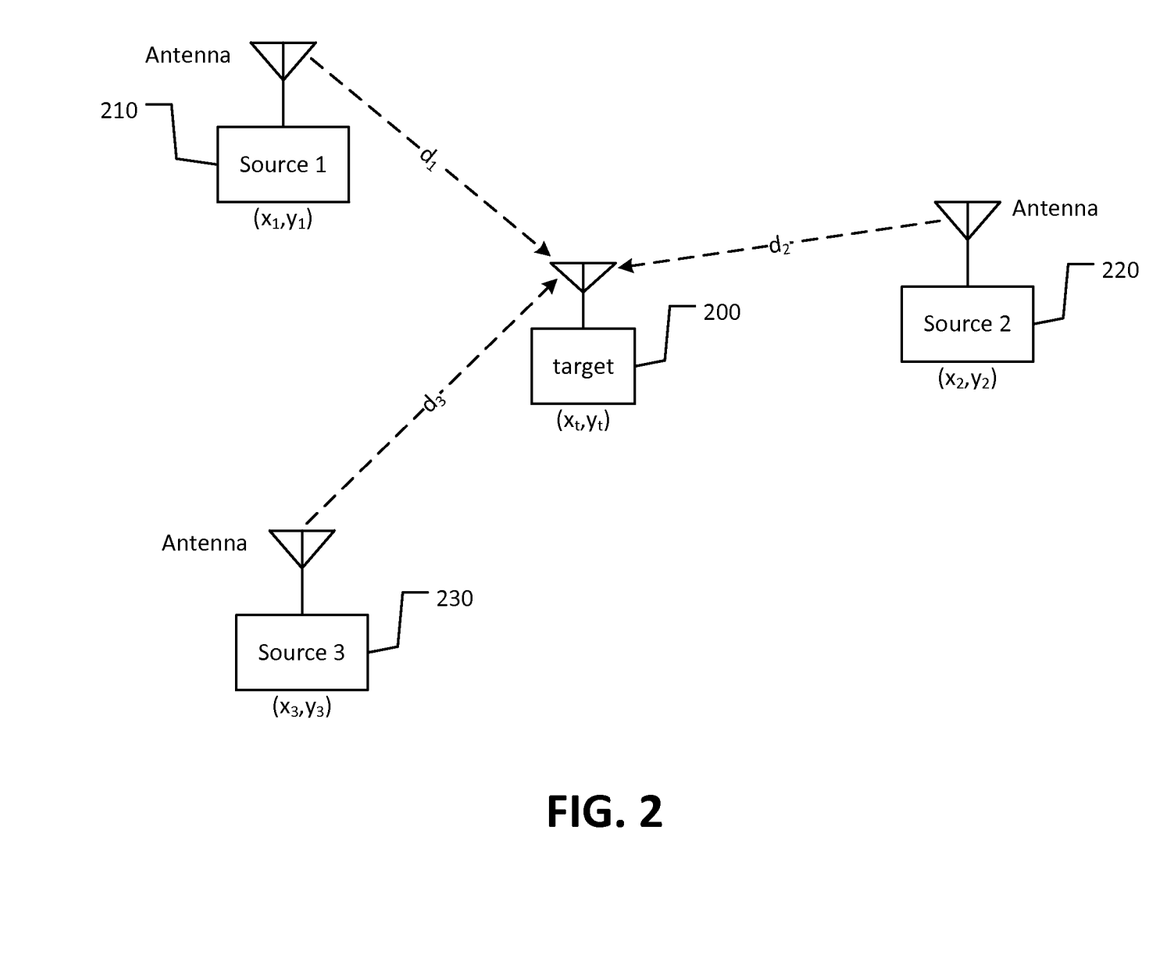
FIG. 2 depicts an example method for determining the location of a device using lateration.

Second, trilateration or triangulation is performed where pair-wise distances and absolute positions of sources are used to derive the device's position. FIG. 2 illustrates an example method for determining the location of a device using lateration of ranging data from multiple sources. As shown in FIG. 2, a device 200 first measures pair-wise ranges from itself to three different signal sources 210, 220, and 230. In FIG. 2, the ranges are indicated as d1, d2, and d3, respectively. If the spherical coordinates of the sources 210, 220, and 230 are (x1, y1, z1), (x2, y2, z2), and (x3, y3, z3), respectively, a mathematical transformation referred to as lateration (in this case, trilateration) may be used to derive the device's spherical coordinates: (xt, yt, zt). In the present disclosure, a device or node for which a location is determined may be referred to as a target. A device or node for which the location is known and may be used as a reference for determination of the location of other devices or nodes may be referred to as a source or anchor.

Such location determination techniques can be computationally expensive and may not be practical for smaller devices. For example, GPS receivers can incur higher costs, and a dedicated GPS would need to be added to the device. Lateration techniques can also be computationally expensive, in particular when accurate results are desired.

In various examples described further in this disclosure, a device location and identification system is described for determining the contextual position of devices communicating in a wireless mesh network. Misidentified locations may be resolved by exchanging ranging information between wireless device peers. In one example, contextual positions may be associated with wireless sensors in a wireless mesh network, where a contextual position may be a predefined position with respect to a known location. The ranging information may be exchanged using conflict resolution messages transmitted via the wireless mesh network. The disclosed examples may be implemented in a number of scenarios and in any type of physical medium where embedded respective positions of various components need to be identified. For example, the device location and identification system may be used to determine the contextual locations of items in a conference room—such as seats and tables, shelving and inventory on a warehouse floor, areas of an agricultural field, seats and monuments in an aircraft cabin, and seats in a movie theater, to name some examples. The items, or targets, that are to be located may be embedded with wireless sensors that may in turn participate in a wireless mesh network.

In one example, the possible contextual positions of the targets may be pre-defined so that each target may be paired to one of the predefined contextual locations. For example, any component, or group of components, in or of an aircraft may be embedded with a wireless sensor. In another example, seats in an aircraft cabin may each be embedded with a wireless sensor, and each seat may be part of a seat map with predefined seat rows and seat numbers. Therefore the contextual position of a seat will be one of a finite number of possible seats in the seat map. When two or more targets are paired to the same contextual location, an identification conflict arises. As further described herein, information exchanged via the mesh network among the sources and targets may be used to resolve identification conflicts. In the present disclosure, a source may refer to a node of the wireless network that has a fixed and known location. Such a source may be used by targets as a reference point for identifying contextual locations.

Figure 3:
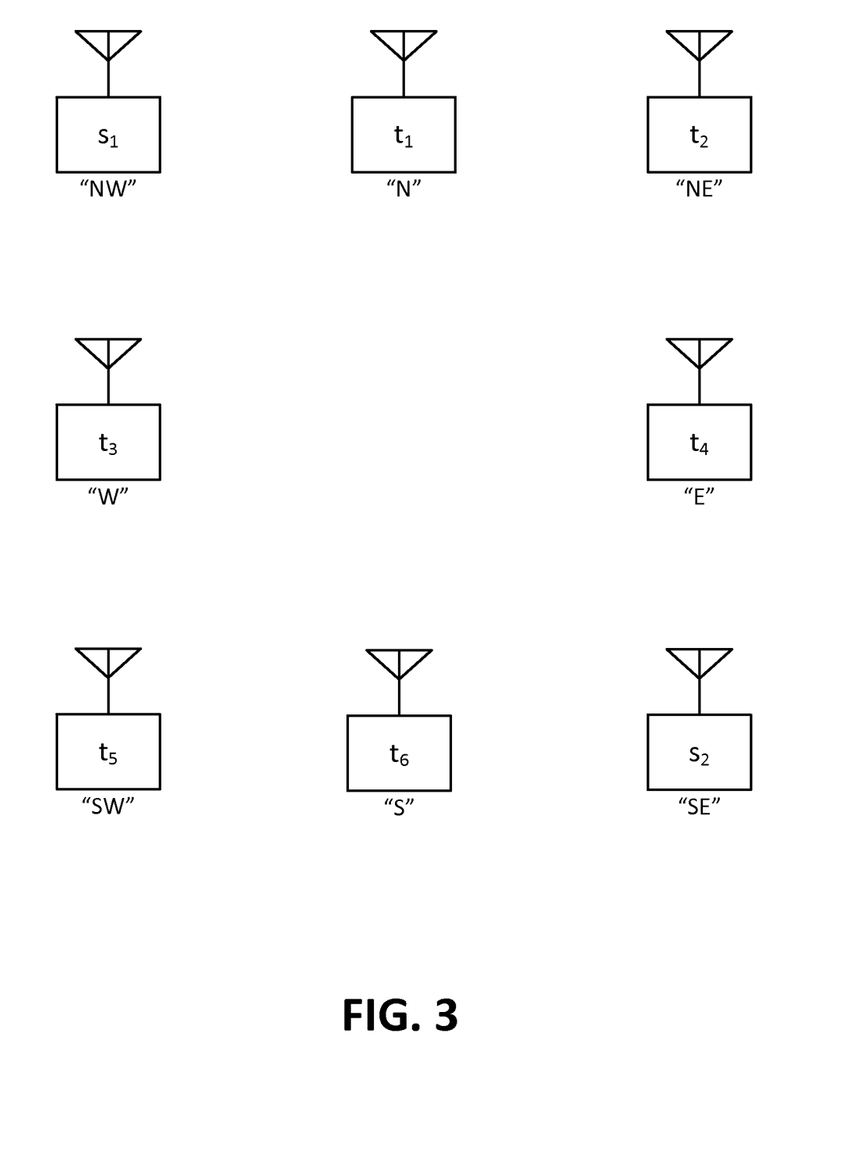
FIG. 3 depicts an example wireless mesh network with devices located in contextual positions.

Referring to FIG. 3, illustrated is an example wireless mesh network with devices (sources and targets) located in contextual positions. The example network comprises two sources (s1 and s2) and six targets (t1, t2, t3, t4, t5, and t6). In this example, the contextual positions of the two sources s1 and s2 are pre-assigned as "NW" (northwest) and "SE" (southeast) for s1 and s2, respectively. The possible contextual locations of targets (t1, t2, t3, t4, t5, and t6) are:
"N" (north)
"NE" (northeast)
"W" (west)
"E" (east)
"SW" (southwest)
"S" (south)

In one example, the following operations may be performed for identification of the contextual positions of targets t1, t2, t3, t4, t5, and t6:

1. Ranging: Each target may measure respective source-to-target distances using ranging methods, such as propagation loss, propagation time, or other means. For example target t1 may measure the source-to-target distance to s1 and the source-to-target distance to s2.

2. 1st Round Identification: Each target may independently estimate its contextual position based on the measured ranges to the sources s1 and s2. In one example, all targets may have access to information indicating the possible (six in this example) contextual positions a priori and each target may select one of the six possible positions based on the measured range data. After each target estimates its contextual position, the targets may announce its estimated position to the wireless mesh network by transmitting a broadcast message. In one example, each target may include its measured pair-wise distances in its broadcast message.

3. Conflict Resolution: In some cases more than one target will select the same contextual position. Since all targets and sources in the network will eventually receive each target's broadcast messages (either one-hop directly or via multi-hop relay communication), each target will have information as to the position conflicts. In one example, during the reception of the broadcast messages from the targets, the targets and sources also measure pair-wise ranges from the broadcasting target to themselves. Therefore, each target will obtain range information not only from itself to each source but also to other targets in the network. Based on the range measurements, a source or target can send out a broadcast message that can be used to resolve one or more of the position conflicts. Such broadcast messages may be referred to herein as conflict resolution messages.

4. 2nd Round Identification: Using conflict resolution messages from nearby targets and/or sources, the targets with position conflicts can modify their contextual positions and broadcast the updated contextual positions. Operations 3 and 4 may be repeated until all targets are assigned unique contextual positions.

Figure 4A:
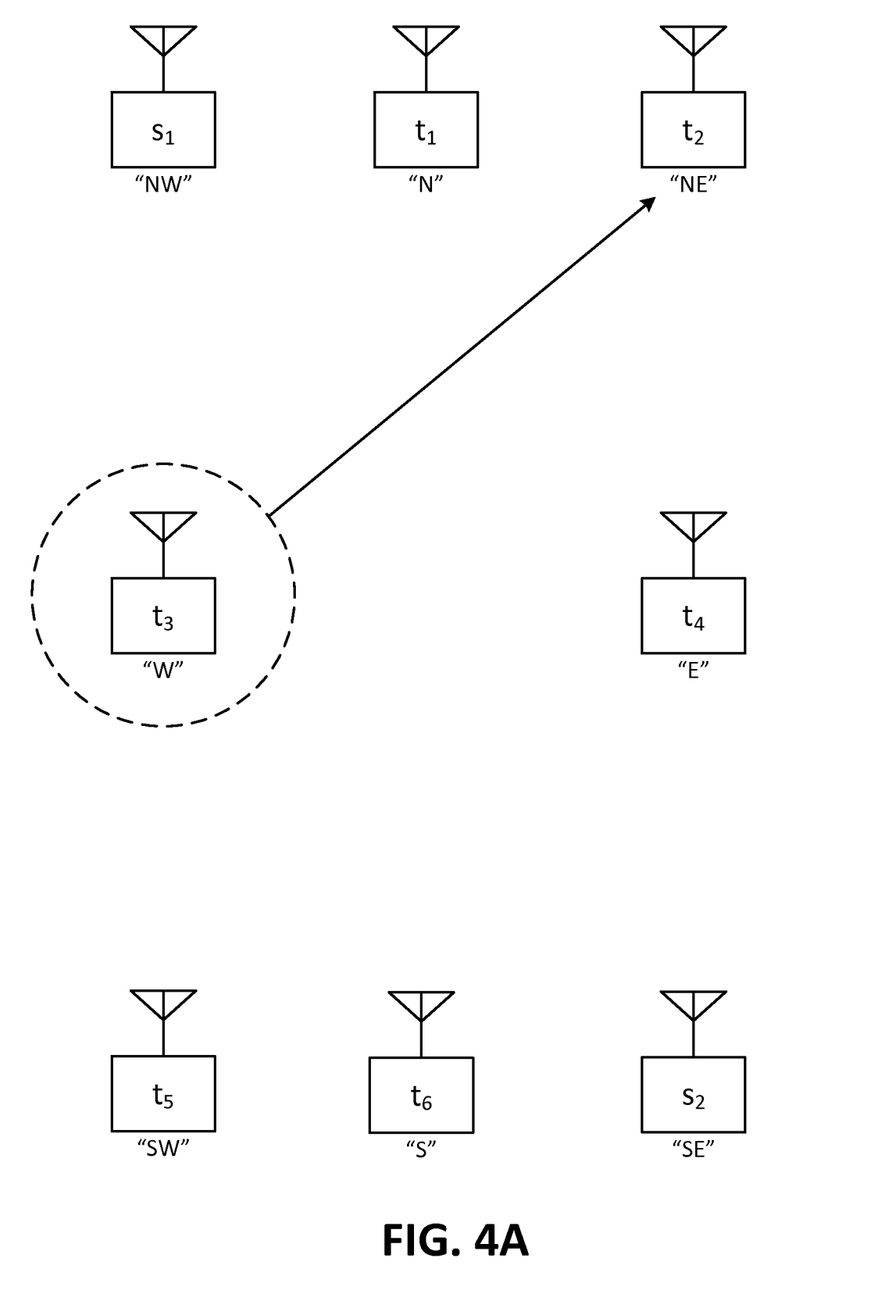
FIG. 4A depicts one example of initial misidentification of a target.
Figure 4B:
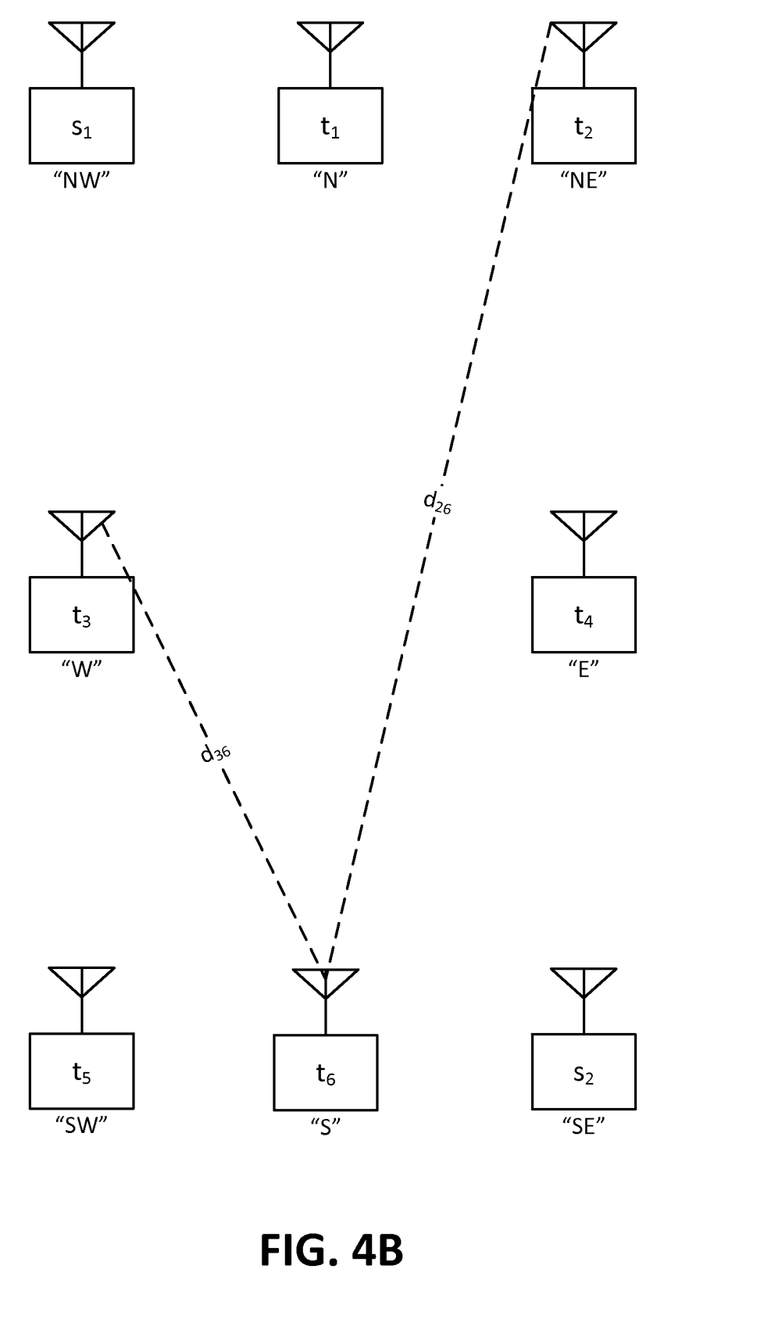
FIG. 4B depicts one example of resolution of an initial misidentification of target.

FIG. 4A illustrates an example of initial misidentification of target t3 and subsequent resolution via broadcast messages. Referring to FIG. 4A, target 3 (t3) misidentifies itself as target 2 (t2). All remaining targets and sources have received broadcasts from t2 and t3 and are aware of the conflict. Some targets may not be able to resolve the conflict because of range ambiguities. For example, two targets may be positioned such that the measured ranges to t2 and t3 may yield similar results. In the example shown in FIG. 4A, source s1 and target t4 may not be able to resolve the position conflict since their respective ranges to t2 and t3 are comparable. In one example, such targets and sources may refrain from broadcasting messages when they are not able to measure sufficiently differentiated ranges to the conflicted targets. The remaining devices in FIG. 4A, however, may be able to detect range differences to targets t2 and t3. These remaining devices may broadcast their measured ranges to targets t2 and t3. Referring to FIG. 4B, the range differences measured by target t6 to conflicted targets t2 and t3 are indicated as d26 and d36, where d36<d26. After reception of these broadcast messages, t3 may re-assess its position and re-assign itself to the "W" (west) position, after which the position conflict may be considered resolved.

After completion of the above described iterative process, there are three possible scenarios:
1. All targets are identified with 100% accuracy and completeness.
2. All targets are identified with <100% accuracy, where some targets may be misidentified (i.e., ID pairs are swapped).
3. Conflict resolution does not complete.

In one example, scenario 2 or scenario 3 may be avoided by the positioning of sources, adoption of an alternative ranging method, or a combination of the two.

Figure 5:
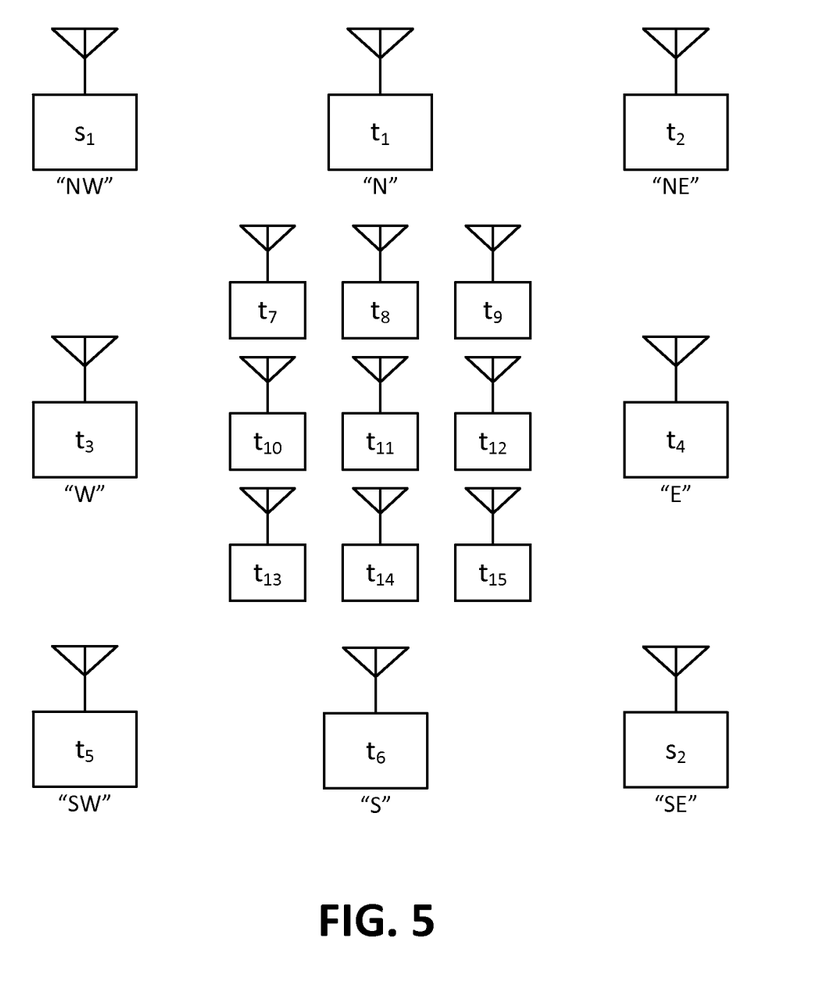
FIG. 5 illustrates a wireless mesh network where additional targets are identified.

In one example, additional contextual positions for a second set of targets may be identified after one or more of the first set of targets is identified. For example, the six targets identified in FIGS. 4A and 4B can now be used as sources to identify a new set of contextual positions shown in FIG. 5. FIG. 5 illustrates a wireless mesh network where the additional targets (t7, t8, t9, t10, t11, t12, t13, t14, and t15) are identified using nested positioning based on previously located targets t1, t2, t3, t4, t5, and t6). In one example, the additional targets (t7-t15) may first be identified using sources s1 and s2. This initial locating step may then be followed by refining the location identification using all available sources (s1 and s2) and (t1-t6). In some examples, only those devices that have accurately measured range differences may participate in conflict resolution. For example, some devices may be identified without any conflicts and such devices may be allowed to participate in conflict resolution of misidentified targets. Additionally or optionally, only those targets that can unambiguously determine ranges to misidentified devices may participate in conflict resolution of the misidentified targets. For example, targets that can measure ranges to the misidentified targets with a sufficiently large difference in measured ranges values to the misidentified targets may participate in conflict resolution. Whether the measured ranges include a sufficiently large difference may be determined based on a predetermined threshold and may be programmable. In some cases, the predetermined threshold may change based on the measurement errors, signal conditions, and other factors.

In the example shown in FIG. 3 with two sources and six targets, the contextual positions of the sources ("NW" and "SE") may be manually configured. For example, the sources may be installed in predetermined locations that have been measured. The remaining target positions may be derived based on the two sources. In one example, a minimum of two sources may be manually configured with source positions in order to unambiguously identify all targets.

Figure 6:
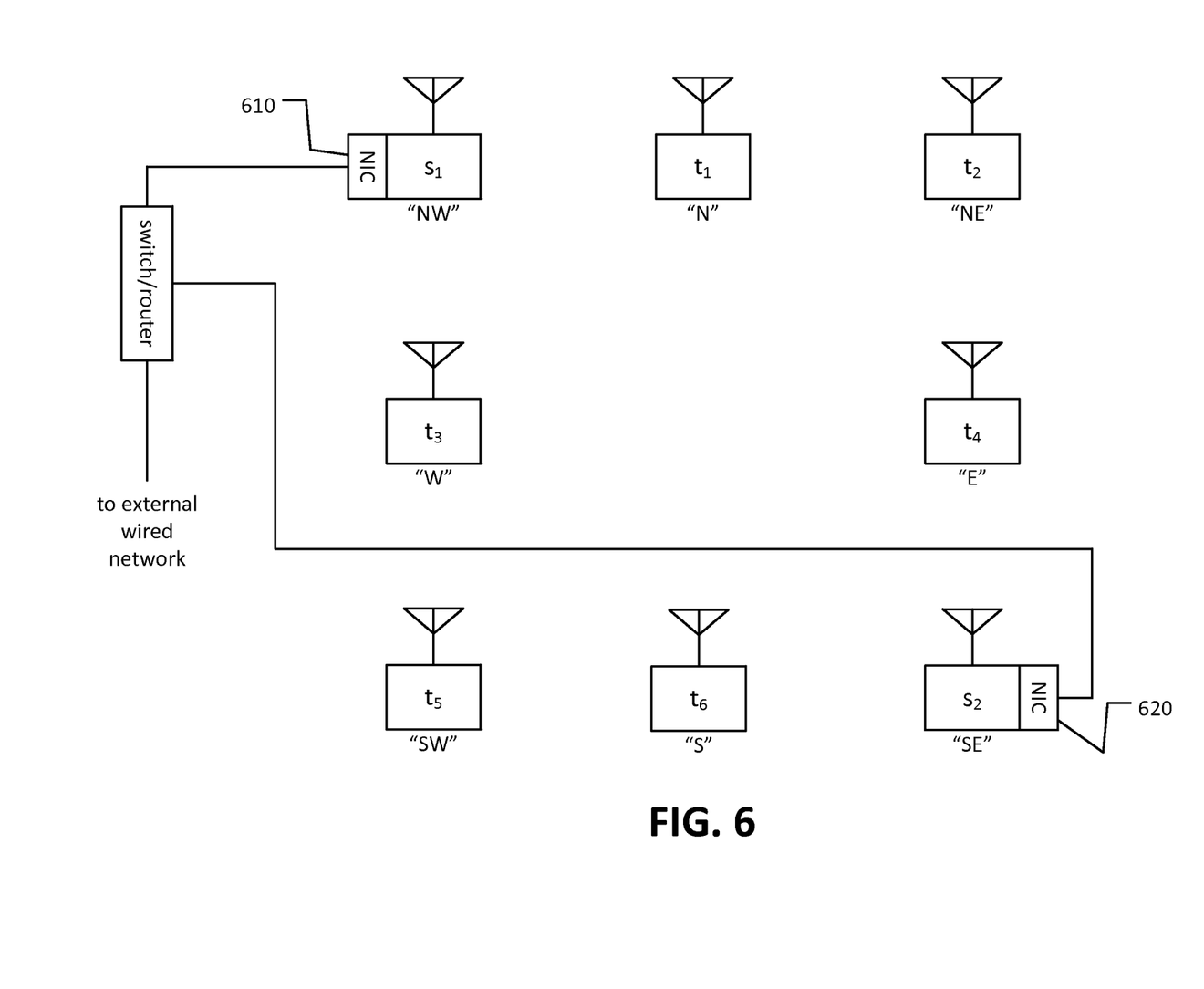
FIG. 6 illustrates an example of a wireless mesh network with wireline network.

In some examples, the sources may include both a wireless transceiver and a wired communication device, such as an Ethernet network interface card (NIC), allowing for communication to an external wireline network as depicted in FIG. 6. FIG. 6 illustrates remote access to wireless sources equipped with wireline (e.g., Ethernet) interface cards, such as NIC 610 and NIC 620. In some examples, the wireline network may be used to monitor and report the convergence of the target identification process.

Figure 7:
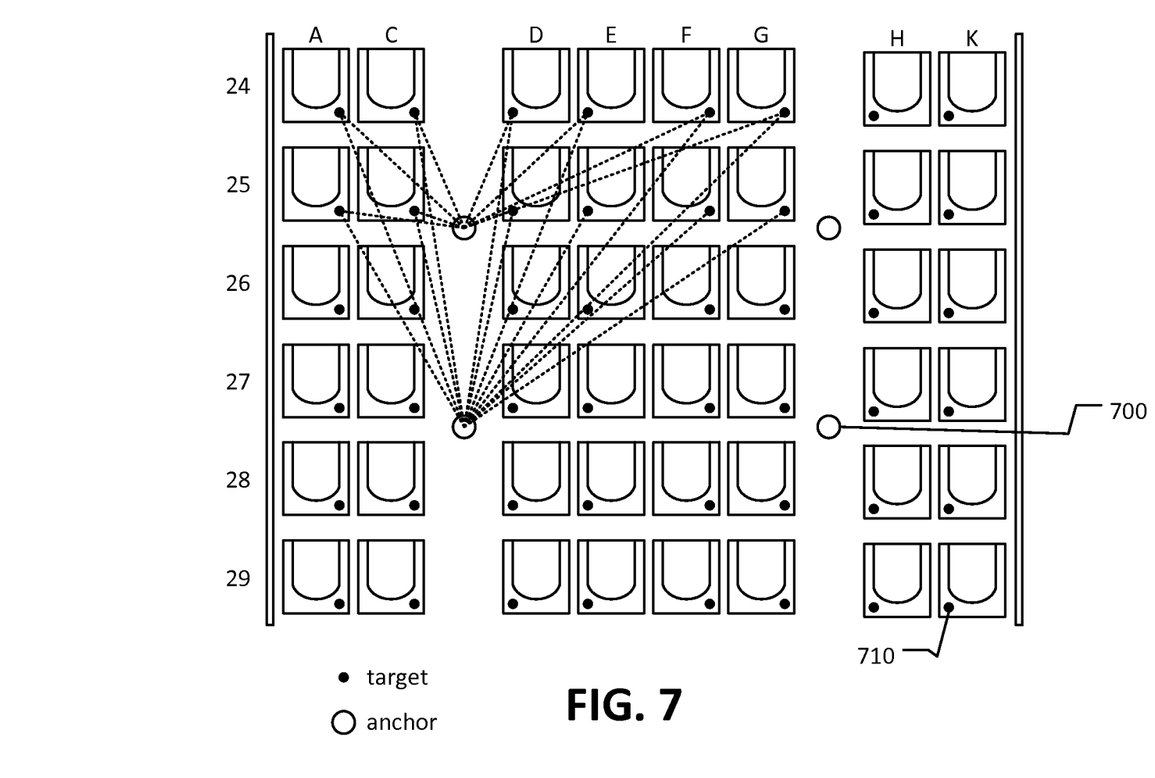
FIG. 7 depicts an example implementation of the present disclosure in a passenger aircraft cabin.

FIG. 7 depicts one example implementation of the present disclosure in a passenger aircraft cabin. Referring to FIG. 7, illustrated are four sources 700 and seat rows 24-29, each with eight seats. Each of the seats are embedded with targets 710. Various wireless technologies may be used such as ZigBee®. Each target, or each seat in this example, may have installed a ZigBee® device. Source-to-target radio signal strength (RSS) may be measured and recorded as an entry in an RSS matrix. Each target may measure the RSS from all available sources and use the RSS matrix to find the best row/seat match.

Figure 8:
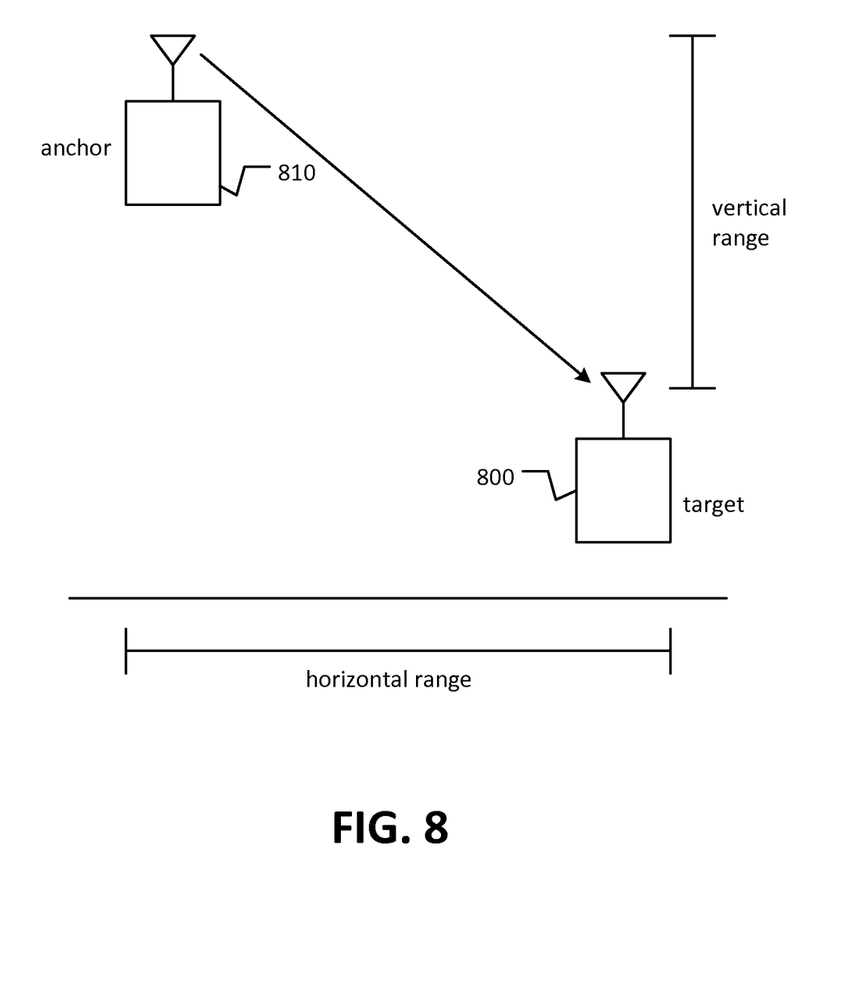
FIG. 8 depicts an example of a radio frequency (RF) propagation-based ranging model.

FIG. 8 provides an example of a radio frequency (RF) propagation-based ranging model. Each target 800 may measure the RSS from an available anchor 810. In one example, a distance matrix containing all possible anchor-target distance entries may be stored and accessible to the target 800. By subtracting the measured RSS from the transmit power, the power loss may be derived. Using the propagation model, the corresponding distance may be computed. The target 800 may use the offline distance matrix to find the best position match.

Figure 9:
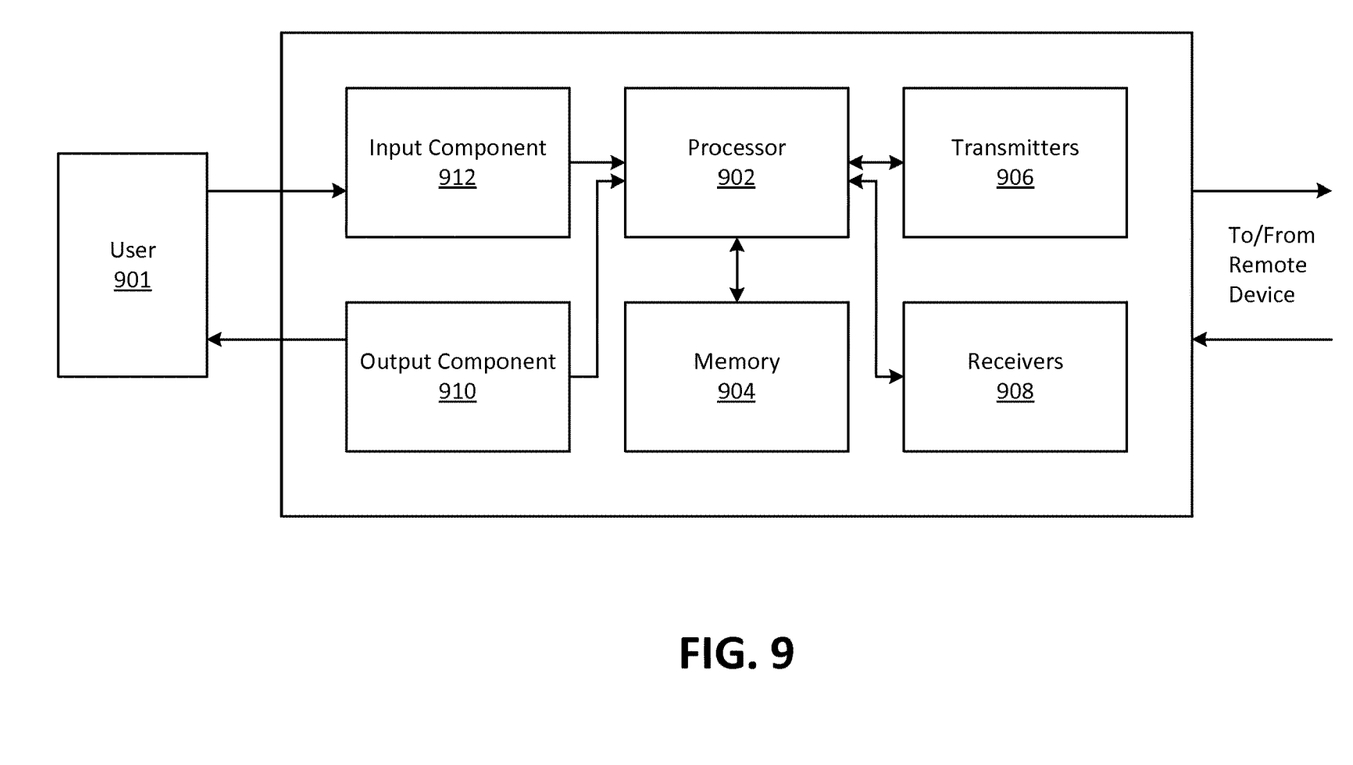
FIG. 9 depicts an example schematic diagram of a node of a wireless mesh network.

FIG. 9 is an example schematic diagram of a node of a wireless mesh network. Targets and sources may include aspects of the example diagram. In one example, a node may include a processor 902, a memory device 904 coupled to processor 902, one or more wireless transmitters 906, one or more wireless receivers 908, an output component 910, and an input component 912.

Processor 902 includes any suitable programmable circuit including one or more systems and microcontrollers, microprocessors, reduced instruction set circuits (RISC), application specific integrated circuits (ASIC), programmable logic circuits (PLC), field programmable gate arrays (FPGA), and any other circuit capable of executing the functions described herein. The above example examples are not intended to limit in any way the definition and/or meaning of the term "processor."

Memory device 904 includes a non-transitory computer-readable storage medium, such as, without limitation, random access memory (RAM), flash memory, a hard disk drive, a solid state drive, a diskette, a Flash drive, a compact disc, a digital video disc, and/or any suitable memory. In the exemplary implementation, memory device 904 includes data and/or instructions embodying aspects of the disclosure that are executable by processor 902 (e.g., processor 902 may be programmed by the instructions) to enable processor 902 to perform the functions described herein. Additionally, the memory device 904 may comprise an operation system and applications.

Wireless transmitters 906 are configured to transmit control signals and data signals over wireless mesh network 100 (FIG. 1). In one example, wireless transmitters 906 may transmit in a radio frequency spectrum and operate using an appropriate communication protocol. Each wireless transmitter 906 may on a particular radio frequency channel or a plurality of channels.

Wireless receivers 908 are configured to receive control signals and data signals over wireless mesh network 100. In one example, wireless receivers 908 may receive signals on a radio frequency spectrum. Each wireless receiver 908 may receive signals on a particular radio frequency channel or a plurality of channels.

The node may also include at least one output component 910 for presenting information to a user 901. Output component 910 may be any component capable of conveying information to user 901. In some implementations, output component 910 includes an output adapter, such as a video adapter and/or an audio adapter or the like. An output adapter is operatively coupled to processor 902 and is configured to be operatively coupled to an output device, such as a display device (e.g., a liquid crystal display (LCD), organic light emitting diode (OLED) display, cathode ray tube (CRT), "electronic ink" display, or the like) or an audio output device (e.g., a speaker, headphones, or the like). In some implementations, at least one such display device and/or audio device is included with output component 910.

The node may also include at least one input component 912 for receiving input from user 901. Input component 912 may include, for example, a keyboard, a pointing device, a mouse, a stylus, a touch sensitive panel (e.g., a touch pad or a touch screen), a gyroscope, an accelerometer, a position detector, an audio input device, or the like. A single component, such as a touch screen, may function as both an output device of output component 910 and input component 912. In some implementations, output component 910 and/or input component 912 include an adapter for communicating data and/or instructions between the node and a computer connected thereto.

Figure 10:
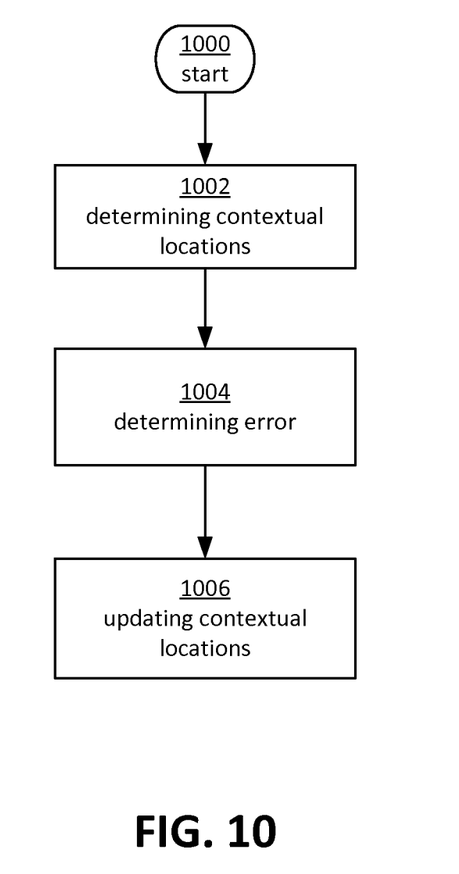
FIG. 10 illustrates an example operational procedure for configuring nodes in a wireless network.

FIG. 10 illustrates an example operational procedure for configuring nodes in a wireless network. In an example, a wireless network may correspond to wireless mesh network 100 in FIG. 1.

Referring to FIG. 10, operation 1000 begins the operational procedure. Operation 1000 may be followed by operation 1002. Operation 1002 illustrates determining contextual locations for a first set of nodes in the wireless network. In one example, the contextual locations may be determined based at least in part on measured ranges to a plurality of fixed nodes having predetermined locations. Operation 1002 may be followed by operation 1004. Operation 1004 illustrates determining that the first set of locations contains at least one error.

Operation 1004 may be followed by operation 1006. Operation 1006 illustrates updating the contextual locations of the first set of nodes based at least in part on measured ranges between pairs of nodes in the first set of nodes. In one example, the contextual locations may comprise a fixed set of locations. Additionally, the nodes in the first set of nodes may select one of the fixed set of locations based on ranges to the plurality of fixed nodes measured by the nodes in the first set of nodes.

In one example, the at least one error may comprise selection of a same location of the fixed set of locations by two of the nodes of the first set of nodes.

In some examples, the measured ranges may be broadcast between pairs of nodes to the nodes of the first set of nodes. However, only measured ranges pertinent to resolution of the at least one error may be broadcast. Additionally, the determined contextual locations may be broadcast to the nodes of the first set of nodes.

Any of the above operations may be iteratively performing until it is determined that the first set of locations does not contain any errors.

It will be appreciated that, while various items are illustrated as being stored in memory or on storage while being used, these items or portions of them may be transferred between memory and other storage devices. Alternatively, in other embodiments some or all of the software modules and/or systems may execute in memory on another device and communicate with the illustrated computing systems via inter-computer communication. In some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

In some embodiments, a system memory may be used which is one embodiment of a computer readable storage medium configured to store program instructions and data as described above for FIGS. 1-10 for implementing embodiments of the corresponding methods and apparatus. However, in other embodiments, program instructions and/or data may be received, sent or stored upon different types of computer-accessible media. Generally speaking, a computer readable storage medium may include non-transitory and tangible storage media or memory media such as magnetic or optical media, e.g., disk or DVD/CD coupled to a computer system or gateway device. A computer readable storage medium may also include any volatile or non-volatile media such as RAM (e.g. SDRAM, DDR SDRAM, RDRAM, SRAM, etc.), ROM, etc., that may be included in some embodiments of the computer systems described above as system memory, gateway device, or another type of memory. Portions or all of the multiple computer systems such as those illustrated herein may be used to implement the described functionality in various embodiments; for example, software components running on a variety of different devices and servers may collaborate to provide the functionality.

It will be appreciated that in some embodiments the functionality provided by the routines discussed above may be provided in alternative ways, such as being split among more routines or consolidated into fewer routines. Similarly, in some embodiments, illustrated routines may provide more or less functionality than is described, such as when other illustrated routines instead lack or include such functionality respectively or when the amount of functionality that is provided is altered. In addition, while various operations may be illustrated as being performed in a particular manner (e.g., in serial or in parallel) and/or in a particular order, in other embodiments the operations may be performed in other orders and in other manners. Similarly, the data structures discussed above may be structured in different ways in other embodiments, such as by having a single data structure split into multiple data structures or by having multiple data structures consolidated into a single data structure, and may store more or less information than is described (e.g., when other illustrated data structures instead lack or include such information respectively, or when the amount or types of information that is stored is altered).

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

In general, the various features and processes described above may be used independently of one another, or may be combined in different ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example examples. The example systems and components described herein may be configured differently than described. For example, elements may be added to, removed from, or rearranged compared to the disclosed example examples.

While certain example or illustrative examples have been described, these examples have been presented by way of example only, and are not intended to limit the scope of the inventions disclosed herein. Indeed, the novel methods and systems described herein may be embodied in a variety of other forms. The accompanying claims and their equivalents are intended to cover such forms or modifications as would fall within the scope and spirit of certain of the inventions disclosed herein.

The invention claimed is:

1. A method for configuring a plurality of nodes communicatively coupled by a wireless network, the method comprising:
   selecting, by each of a first set of the nodes, one of a plurality of selectable predefined contextual locations of a defined volume or space for the first set of nodes, wherein the selectable predefined contextual locations comprise mutually exclusive physical locations of the first set of nodes, and wherein the selectable predefined contextual locations are selected by the nodes based at least in part on measured ranges to a second set of the nodes, the nodes of the second set of nodes having known locations so that the selectable predefined contextual locations can be selected based on the measured ranges to the known locations, wherein the selection is self-performed by each of the nodes of the first set;
   broadcasting, via the wireless network and by each node of the first set of nodes, the selected locations and measured ranges to other nodes of the first set of nodes;
   based on the broadcasted selected locations, determining, by the nodes of the first set, that the selected predefined contextual locations for the first set of nodes contains at least one error associated with the selection of the predefined contextual locations; and
   updating the selected predefined contextual locations of the first set of nodes based at least in part on the broadcasted selected locations.

2. The method of claim 1, wherein the at least one error comprises selection of a same location of the predetermined set of nodes by two of the nodes of the first set of nodes.

3. The method of claim 1, wherein only measured ranges pertinent to resolution of the at least one error are broadcast.

4. The method of claim 1, wherein the determining comprises processing the selected predefined contextual locations to identify at least one contextual location error.

5. The method of claim 4, wherein ranges are measured between nodes determined to be associated with an erroneous location and nodes positioned so as to be capable of unambiguously resolving the erroneous location.

6. The method of claim 1, further comprising iteratively performing said updating until it is determined that the updated selected predefined contextual locations of the first set of nodes does not contain any errors.

7. The method of claim 1, further comprising determining selectable predefined locations for a second set of nodes in the wireless network, the selectable predefined locations for the second set of nodes determined based at least in part on measured ranges to one or more of the first set of nodes.

8. The method of claim 1, wherein the wireless network is a ZigBee network.

9. The method of claim 1, wherein the ranges are determined using received signal strength (RSS) measurements.

10. The method of claim 1, wherein the nodes are associated with components of an aircraft.

11. A device configured to communicate in a peer-to-peer wireless network, the device comprising:
   a radio configured to communicate in the peer-to-peer wireless network, wherein the device is configured to:
   determine one of a plurality of a predefined contextual selectable locations based at least in part on measured ranges to a plurality of nodes having known locations so that the selectable location can be selected based on the measured ranges to the known locations, wherein the selection is self-performed by the device, and wherein the predefined contextual selectable locations comprise physical locations of the device;
   broadcast, via the peer-to-peer wireless network, the determined one of the predefined contextual selectable locations and measured ranges to other devices in communication with the peer-to-peer wireless network;
   receive selectable locations selected by the other devices and range data measured by the other devices; and
   update the determined one of the predefined selectable location based at least in part on the received range data and selectable locations selected by the other devices so that no two devices have selected a same selectable location.

12. The device of claim 11, wherein the device is further configured to:
- determine that the determined selectable location of at least one of the other devices is erroneous;
- measure a range to the at least one other device with the erroneous determined selectable location; and
- broadcast the measured range over the peer-to-peer wireless network.

13. A non-transitory computer-readable storage device having computer-readable instructions stored thereon, the computer-readable instructions comprising instructions that upon execution on a computing system, at least cause:
- selecting one of a plurality of predefined contextual selectable locations based at least in part on measured ranges to a plurality of nodes having predetermined locations, wherein the predefined contextual selectable locations comprise physical locations of the device for the nodes;
- receiving locations selected by other devices communicating in a peer-to-peer wireless network;
- determining that at least one of the selectable locations selected by the other devices is erroneous;
- measuring a range to the at least one other device with the erroneous selected location; and
- broadcasting the measured range over the peer-to-peer wireless network so that the erroneous selected location can be resolved so that no two devices have selected a same location.

* * * * *